United States Patent [19]
Norkum et al.

[11] 3,777,177
[45] Dec. 4, 1973

[54] STEP LEVEL PROBE

[76] Inventors: Alphonse A. Norkum, Box 86, Porcupine, Ontario, Canada; Joseph D. Corrigan, c/o Falconbridge Dominicana Corporation, Bonao, Dominican Republic; Keith Davies, 308 Toke St., Timmins, Ontario, Canada

[22] Filed: Aug. 21, 1972

[21] Appl. No.: 282,008

[30] Foreign Application Priority Data
Oct. 6, 1971 Canada .............................. 124560

[52] U.S. Cl. .............................. 307/118, 73/304 R
[51] Int. Cl. ............................................ H01h 35/18
[58] Field of Search .................. 73/304 R; 307/118, 307/116, 149, 119; 328/4; 317/DIG. 3; 324/62 R, 65 R, 72

[56] References Cited
UNITED STATES PATENTS
3,373,351 3/1968 Rak.................................... 73/304 R
3,036,736 5/1962 Murphy et al. .................... 73/304 R

*Primary Examiner*—Herman J. Hohauser
*Attorney*—George H. Spencer et al.

[57] ABSTRACT

An elongated probe for measuring the depth of conductive liquids in a tank is built up of alternating hollow contact units and insulator units attached together. Preferably, for thick slurries the contact unit comprises a shrouded disc on an insulated arm so as to give the effect of conductive island surfaces spaced along the length of the probe, but away from its surface. The base of the hollow probe is preferably closed with a metal plug which can rest on the bottom of the tank. The probe construction is such that circuitry can be developed which will enable high and low level alarms to incorporated anti-splashing protection; a circuit to control liquid level by operating an inlet valve is also shown.

14 Claims, 6 Drawing Figures

STEP LEVEL PROBE

This invention relates to probes which are used in tanks of free flowing materials in order to measure how much remains or how much has been removed. More particularly, it will enable measurement of the depth of free flowing material having an appreciable conductivity even though that conductivity may be small; thus, although the probe has been developed principally for use in measuring the height of suspensions of conducting metals or ores, or salts, in the mining and metal extraction industries, yet a liquid such as normal household water is usually sufficiently ionized to give adequate readings.

As a practical matter probes for tanks used in the mining industry have been either of the "on-off" type (virtually float actuated switches) or of the continuous type. Such stepped probes as do exist are usually of the capacitance bridge type and their construction is rather elaborate and expensive. Again, as a practical matter ultra-sonic probes are on the market but these tend to be expensive and are unsuitable for digital control. A typical example of a capacitance probe is marketed under the trademark "Level Lance" by Custom Control Co. A probe which measures resistance change of an element within a jacket is available under the trademark "Metritape" but the manner in which the resistance is changed makes the readings liable to be affected by density of the liquid and pressurizing of the tank also can alter readings. Therefore, in practice the electrical conductance of the liquid is not used to any great extent to measure depth.

Turning to the patent literature, this also discloses some probes which operate upon the capacitance principle (e.g. United States Pats. Nos. 2,868,015 and 3,343,415). However, level measuring devices using the conduction of the liquid seem to be confined to the gauge principle, i.e., the liquid is inside the device, (e.g. United States Pat. No. 2,869,368) which is, of course, quite unsuitable for slurries that may be quite thick with 80 percent of solids by weight.

Those probes that have been developed in the patent literature suffer from much the same disadvantage as the capacitance probes in that their assembly requires wires to be fed along elongated plastic tuves which are then filled with plastic. Such a probe is shown in United States Pat. No. 3,461,722. However, this probe is more in the nature of a high level and low level controller than a true digital probe and the need for such a probe is illustrated in United States Pat. No. 3,184,970.

The probe we have described below is a modular construction, that is a reiteration of units. Thus, a digitalized probe is implicit in the construction and this may be extended to the circuit.

The drawings show a probe and its circuit diagram to illustrate one example of a device incorporating the inention and its operation; and in these drawings:

FIG. 1 shows a broken side elevation of the probe in order to allow a part section of the two ends to be shown in adequate detail and to convey the idea of length. Such a probe may easily be 20 feet or more in length and as mentioned above and explained below, an increase in length with corresponding increase in the number of levels serviced does not compound the difficulties of manufacture.

Figure 1:
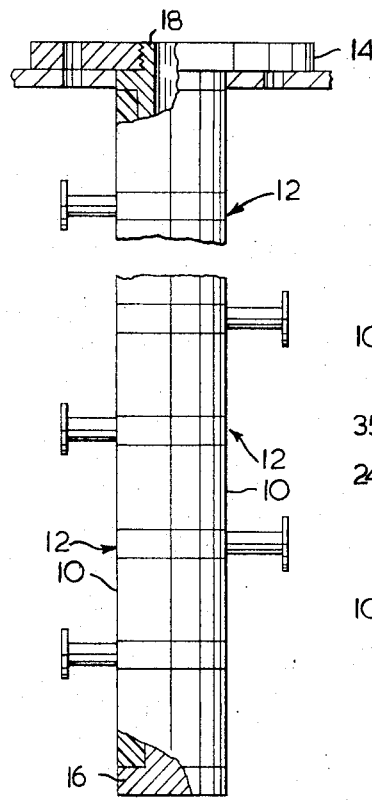
FIG. 1 is a side elevation of a short length of a probe suitable for use in slurry.

The probe illustrated in FIG. 1 comprises basically a number of alternate insulating and contact units 10, 12 with an end flange 14 and an end plug 16. As can be seen from FIG. 2, unit 10 is a sleeve of insulating plastic material which is internally threaded; contact unit 12 in contrast is an assembly of a metal union 18, a shaft or arm having a plate electrode 20 at one end and insulating sleeves 22, 24.

To assemble the probe contact units 12, sleeves 24 which have a hole to allow the shaft of contact electrode 20 to pass through, are assembled on unions 18; an assembly of contact electrode 20, with insulating sleeve 22 on it, is screwed into each union.

A contact unit and an insulating unit are then assembled together as a module using a sealing compound on the threads between them; a resistor 26 is then secured by attaching a short connecting wire to the contact unit around screw 28 in the upper end face of union 18 (the lower end face being within the insulating unit of the module) the long connecting wire projecting away from the module and being temporarily free. However, when all the assemblies of one contact unit with one insulating unit are being assembled together to form the probe, the free connecting wire of the resistor 26 of one assembly is joined to the fixed wire of the next at the screw 28. It will be understood (as explained below in the context of the circuit diagrams relating to FIG. 5) that it may be desired to attach a single wire to the screw 28 for a lead to an external relay in this case such a connection may be made and subsequent assemblies of a contact unit 12 with its insulating sleeve 10 can be threaded along the insulating wire. It will also be understood that an insulated wire 34 is connected to the plug 16 which is the lowest point of the probe and the probe is assembled building upwardly with alternate insulator and contact unit assemblies from this point.

The assembly of the probe described above is thus started by screwing a plug 16 into the lowermost insulating sleeve 10, again with thread sealing compound; and finished by a flange 14 screwed onto uppermost union 18 which of course, is not electrically connected (except indirectly to ground) and is thus not a contact unit. The flange 14 enables the probe to be bolted to the top of the tank.

Typically, the overall axial length of the contact unit is about two inches, the central land 35, being half an inch long axially and the threaded portions three quarters of an inch long each. The overall probe diameter can be chosen to suit the application and is typically an inch and a half diameter. The central hole need only be about ⅜ inch diameter because there may be fewer leads than contact units as will be explained.

The contact electrode shaft is typically ¼ inch diameter, and projects radially outwardly about 1 inch, terminating in a ¾ inch diameter button 37 about ⅛ of an inch thick. The insulating plastic sleeving 22 may be molded or even heat shrunk onto the contact electrode, as it need be only about 1/16 inch thick. As will be seen from the detail of FIG. 2 we prefer the insulation 22 to shroud the periphery of the contact button 37. This shroud will reduce the area of contact of any streamer hanging downwardly from the arm with the contact button 37 itself.

Before leaving the general construction of the probe assembly it will be seen that we undercut the last one or two threads on the union 18 to provide a face to face abutment, which assists sealing. It will also be obvious that other types of seal can be used between adjacent insulating and contact units and that they can be fastened together by means other than a screw thread. Such other methods are well known and the choice is within the ability of a mechanical designer. We prefer the design shown because screw products are available so easily and inexpensively and pipe sealing compounds are so well known.

Figure 2:
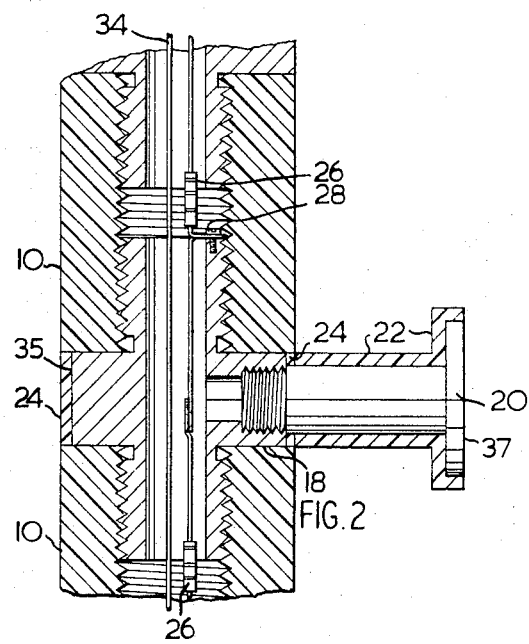
FIG. 2 is a section of the probe along its longitudinal axis.

The probe illustrated in FIGS. 1 and 2 is designed to be used with thick slurries which may be as much as 80 percent by weight of conductive material held in suspension. Such material tends to be thixotropic or highly viscous and does not run down off the probe very quickly. However, the disc end of the electrode will not support a build up of conductive material. Even if the cylindrical portion of the probe is virtually covered with slurry when the level drops, the material will fall away from the insulation 22 of the arms and break the continuity between one disc and the next.

Figure 3:
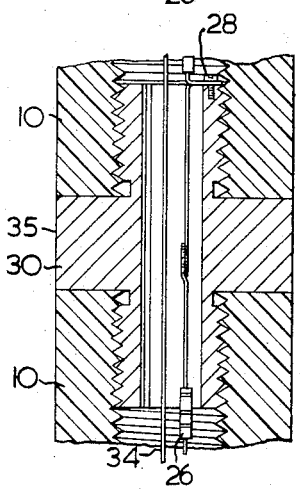
FIG. 3 is a section of an alternative probe for use with conductive liquids such as water which are much less viscous than slurries.

The assembly illustrated in FIG. 3 is a simplified probe in that the assembly of union 18, electrode 20 and insulating sleeves 22, 24 have been replaced by a simple fitting, similar to a pipe union, 30 which is preferably of the same diameter as insulating threaded sleeve 10. This probe is suitable for liquids of low viscosity which will conduct electricity, such as tap water which normally contains enough dissolved salts so that it ionizes fairly easily. However, the volume conductivity is small enough so that even if there is a conducting path over the surface of the insulating unit 10 it will be very thin, due to the low viscosity.

Typically, in probes intended for measuring depth of water resistance 26 has a value of 10,000 ohms and physically it is a standard ¼ watt resistor; and typically also there will be no conductance path along the outside of the probe as we prefer to make the insulating unit of a plastic such as polyethylene whose surface is non-wetting. Any remaining water will tend to bunch into droplets on the surface rather than to spread out. Unions 30 are of brass when liquids such as water are to be probed. Of course, the probe may be constructed of other materials, depending on the use to which it is put, such as mild steel for the union and ceramics for the insulating units.

Figure 4:
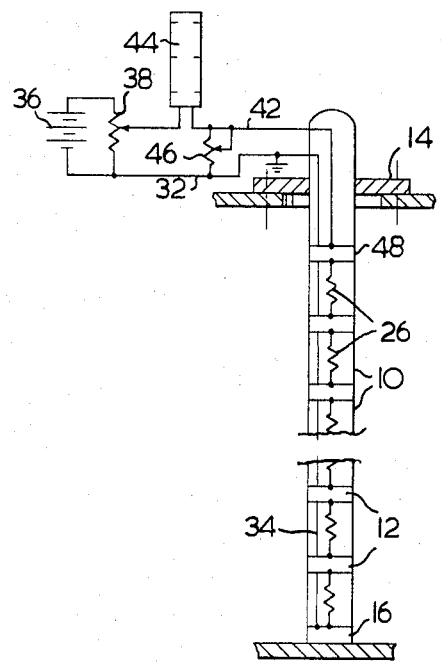
FIG. 4 illustrates a simple circuit diagram.

Turning to the circuit diagram shown at FIG. 4, units 10, 12 making up the probe assembly are typically identified as are resistors 26. It will be understood that the probe contact electrode (whether of FIG. 2 or 3) will have no influence on the circuit, except indirectly as to values: the thick slurry would probably be more conductive and lower values of voltage and resistance would be more suitable. A regulated DC supply, indicated at 36, is applied across a range adjusting potentiometer 38, from which a voltage is picked off and applied to the probe through leads 32, and 42. Also included in the circuit is an ammeter, 44, which preferably has a vertical movement and is calibrated to read from "empty" to "full" and a zero adjusting potentiometer 46.

As the water level rises the various resistors 26 are successively short circuited and the final resistance path between leads 34 and 42 together will comprise the liquid-to-metal contact resistance at the plug 16 and at the uppermost union 48 in the circuit. I prefer to arrange the values of resistors 26 in relation to the contact resistance and voltage so that the current increases 1 milliamp per step from 4 milliamps to 20 milliamps but, of course, the values can be arranged so as to expand the scale of liquid height at certain locations if desired. Such techniques will be obvious to those skilled in the art and elaborate description of values if therefore unnecessary.

It will be understood that in some circumstances it may be desirable not to make the base plug conductive but to make the ground connect to the lowest ordinary contact unit 12. Usually, however, if the tank is of metal and the probe is long, a metal base plug in contact with it affords support and the ground can be connected to it both internally and as well as externally.

Figure 5:
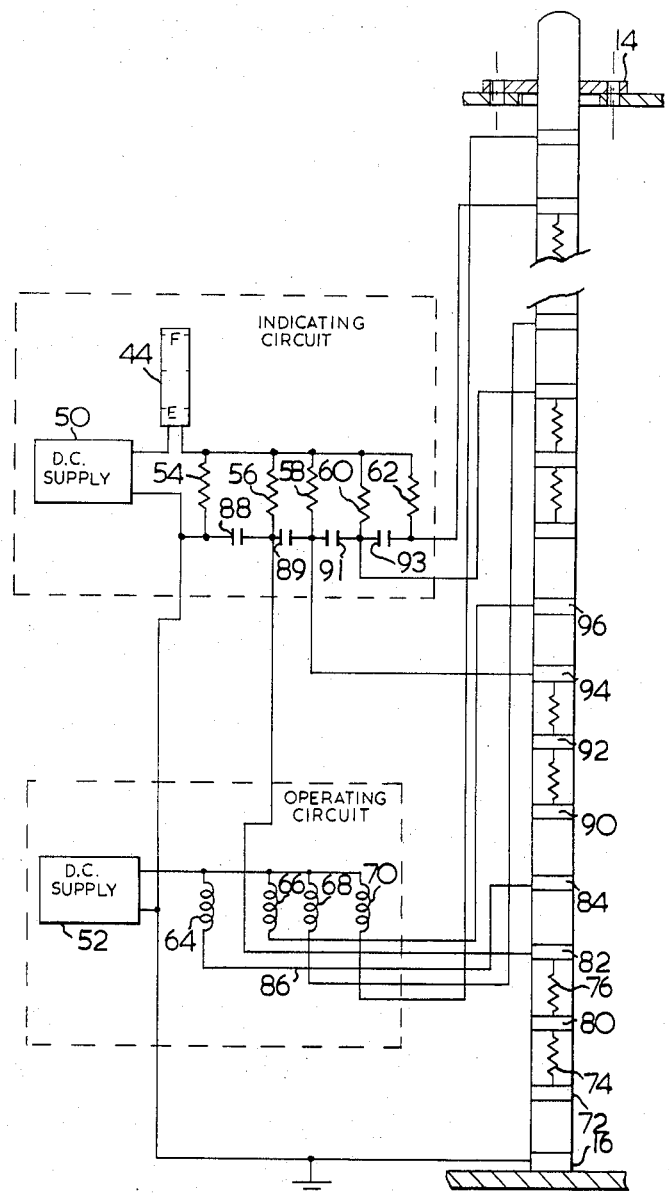
FIG. 5 illustrates a relay operates switching circuit which is suitable for use with computer control circuit.

However, we prefer to use the circuit of FIG. 5 which is self calibrating. This is of advantage because the electrode-to-liquid contact resistance may vary depending upon the nature and amount of solids in the liquid (and of course whether they are suspended conducting solids forming a slurry or if they are ionizable salts dissolved in the liquid). In the circuit of FIG. 4 a liquid contact resistance higher than that at which potentiometers 38 and 46 were adjusted will make all readings appear low - the tank will never seem full as far as the ammeters shows.

By contrast, in FIG. 5 there are two separate voltage sources 50, 52 neither of which requires adjustment for variations in liquid resistance. Voltage source 50 supplies resistance 54, 56, 58, 60 and 62 in parallel successively as the liquid level rises and causes relays 64, 66, 68 and 70 to close in turn.

Thus, typical values are such that we find a 40 volt DC supply and resistor values of 10,000 ohms for each of resistors 54-62 with a 0-20 milliammeter 44, gives good calibration for water which will ionize readily. If the tank is empty the milliammeter will more, when the supply is switched on, to the empty mark at 4 milliamperes, the current passing through resistor 54; the end plug 16 is assumed to be physically at the bottom of the tank, as well as at the same electrical potential by grounding.

When the liquid level rises to contact 72 a parallel path occurs from ground potential (plug 16 or the tank) through the liquid, electrode contact 72, resistor 74, resistor 76, lead 78 and resistor 56; and flow through this path will be about 1 milliamp. Because the resistance through the liquid is only a part of the total and is added to 30,000 ohms it can vary quite widely from 10,000 ohms without affecting the 1 milliamp current. At this point the total current indicated by the milliameter, 44, is 5 milliamps.

The liquid, still rising, next shorts out resistor 74 when it touches contact 80; and the resistance path is from groung (plug 16) through the liquid to contact electrode 80, and thence through the 20,000 ohms of resistors 76 and 56 so that the current flowing through this parallel path is now about 2 milliamps and the meter, 44, summing this with the 4 milliamps through resistor 54 indicates a level corresponding to 6 milliamps.

Similarly when the liquid rises to contact 82, the resistance 76 is cut out and the current rises further; this represents the maximum error between the actual physical level and that indicated by the total current which should be 7 milliamps.

The next step operates differently in that when the level rises to contact 84 the current flow through the liquid passes through lead 86 to operate relay 64 closing contacts 88. Thus, resistor 56 is directly in parallel with resistor 54 and is now fed by voltage source 50. Both resistors 54, 56 pass 4 milliamps so that the quarter full mark will be accurate.

Similarly, also it will be appreciated that exactly the same steps of approximately one milliamp are added successively as the liquid rises to contact electrodes 90, 92, 94 and 96; the last step closes the contacts 89 of relay 66 to put resistor 58 across supply 50 so that ammeter 44 shows 12 milliamps, the halfway mark, accurately.

The third and fourth quarters follow the same procedure, and at the full level, of course, contacts 88, 89, 91 and 93 of relay coils 64, 66, 68 and 70 will be closed and 4 milliamps will flow through each of resistors 54, 56, 58, 70 and 62 in parallel to give a total of 20 milliamps so that calibrated milliammeter 44 will read "Full."

Figure 6:
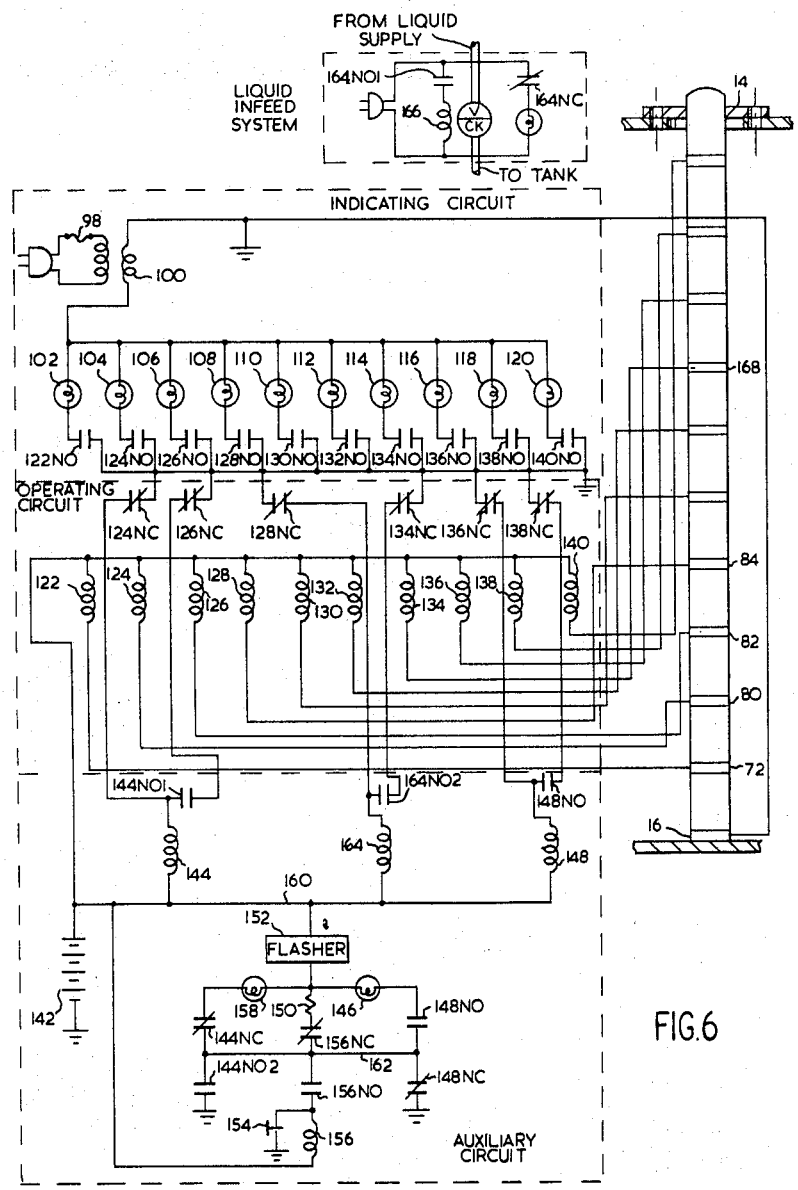
FIG. 6 illustrates another relay operated switching circuit with anti-splashing protection for the low level and high level alarms.

A further circuit at FIG. 6 shows the adaptability of the basic probe to operate indicator lights, low and high liquid level alarms and antisplashing circuitry. In this an AC supply voltage feeds transformer 100 through fuse 98, the transformer secondary supplying a number of indicating lamps 102, 104, 106 through 120 at a convenient voltage, such as 24 volts, for panel mounting. Separate from this is a DC supply voltage 142, for operating relays 122, 124, 126 through 140 — it will be understood that although the DC supply 142 has been shown diagrammatically as a battery it will usually be taken from the same AC supply voltage that feeds transformer 100, but suitably rectified. Whatever practical form it takes we prefer the DC supply to be at 50 volts.

As the level of the conductive liquid rises from the bottom of the tank it first connects grounded plug 16 to electrode contact 72 thus putting the DC supply voltage 142 across coil 122. This closes normally open contacts 122no turning on lamp 102. As the level continues to rise the current through the conductive liquid successively energizes relays 124, 126, 128 etc. closing normally open contacts 124no, 126no, 128no, etc. turning on lamps 104, 106, 108 etc. Equally, when the tank is being emptied and the level drops the relays are successively de-energized and the contacts revert to their normally open position. It will be understood that by "normally open" we mean contacts are open when the relay is not energized and closed when it is energized.

This probe and circuit also incorporates an antisplashing device for a low liquid level alarm as will now be explained. When relay 126 is de-energized as the liquid level drops its normally closed contacts 126nc close. However, coil 144 of the low level alarm relay has not been energized and the ground applied by contacts 126nc is applied to normally open contacts 144no1 of the relay coil and is not applied to the relay coil 144 itself. However, when the liquid level drops further, relay coil 124 loses its energization and normally closed contacts 124nc close; this causes coil 144 to become grounded, energizing the low alarm relay. It will be seen that if the level should rise slightly (as by wave motion, splashing or the like) and energize relay 124, yet the low level relay will not bounce because although one end of its coil 144 will have lost one ground through contacts 124nc, yet the relay is self-holding and maintains the other ground through its own contacts 144no1 and 126nc. The low level alarm will thus stay actuated until the level rises sufficiently to re-energize relay coil 126 and open contacts 126nc so that the other ground is also lost to coil 144.

It will also be understood that the second set of normally open contacts 144no2 also closes when relay coil 144 is energized and that this completes the circuit to the low alarm lamp 146 through the "normally open" contacts 148no of the high level alarm relay 148. It can be seen from the circuit diagram of FIG. 6 that when the liquid level is low, relay 148 is energized so that its "normally open" contacts are closed. The operation of the high level relay which loses its energizing current when the liquid rises beyond a predetermined point will be described later in the next paragraph but one.

Although other methods of alarm can be used we prefer to maintain the visual presentation and we parallel this low alarm lamp 146 by resistor 150 to allow sufficient current to operate flasher unit 152. This continues to flash the lamp until the alarm condition is acknowledged by pressing push button 154 which momentarily grounds the coil 156 of an acknowledgement relay. Normally open contacts 156no close and normally closed contacts 156nc open; these contacts cause respectively the relay 156 to hold itself closed and the resistor to lose its ground so that current no longer flows through it. As there is insufficient current to cause the flasher to flash, the low level alarm lamp 146 remains steadily lit. Of course immediately the liquid level rises to operate relay 126 normally closed contacts 126nc will open, relay 144 cannot hold itself closed as it has lost its ground and both its normally open contacts 144no and 144no2 will open, the latter resetting the low level alarm circuit.

The high level alarm operates on much the same basis as the low level alarm with the exception noted above that, if the liquid level is below the upper desired limit, coil 148 is energized by its connection between 160; and ground obtained from normally closed contacts 136nc and 138nc of the corresponding relays whose coils 136, 138 are as yet unenergized. As the level rises, the liquid grounds one end of coil 136, thus energizing this relay and opening normally closed contacts 136nc. However, no physical action takes place as the relay coil 148 still holds itself energized through its own "normally open" contacts 148no1 and normally closed contacts 138nc, because relay coil 136 is as yet unenergized; all that has happened is that the anti-splash circuit has been set. When the liquid level rises to the next contact electrode relay coil 138 is energized, so that the normally closed contacts 138nc open; coil 148 loses its other ground and becomes de-energized so that the normally open contacts 148no open. This means that the alarm will continue until the level of the liquid falls so that relay coil 136 is de-energized and normally closed contacts 136nc close. This restores the earth to coil 148 re-energizing the relay to close contacts 148no1, 148no2 and opening contacts 148nc; the effect is to reset the anti-splashing circuit, to reconnect the low level alarm lamp 146 in the circuit and to remove the ground from the high level alarm lamp 158 respectively.

The resistor 150, flasher unit 152, acknowledge push button and relay 154, 156 operate exactly as before from the common lines shown at 160, 162.

One further feature shows how the probe and circuitry of our invention can be used for controlling the level of fluid, or other similar function without the operator's attention. Suppose that the control relay 164 operates to open a solenoid type inlet valve 166 to the tank by a pair of normally open contacts 164no1; then the liquid level, on falling below probe unit contact 84 will cause the coil 128 to become de-energized so that normally closed contacts 128nc close grounding coil 164, and thereby energizing this relay to allow more liquid to enter the tank by energizing solenoid 166 through contacts 164no1. When the liquid level rises to probe unit contact 84, coil 128 will become energized operating the relay and causing closed contacts 128nc to open. However, relay 164 will still remain energized, holding itself closed through normally open contacts 164no2 which connect the coil to earth through the normally closed contacts 134nc of relay 134 which is as yet not energized because the liquid level is low.

When the liquid level rises to contact elecrode 168 relay 134 is energized, and normally closed contacts 134nc will open and the control relay 164 will be de-energized as it loses its other ground; the solenoid type inlet valve will return to its closed position. Lamp 170 or some other suitable indicator may also be switched across a suitable supply by contacts 164nc to show this condition.

Obviously, similarly the outflow can be provided with a solenoid valve to deliver a given volume of fluid.

Thus, we have provided not only a simple, easily assembled modular type probe but our probe can provide a number of services by adjusting the circuitry used with it.

While there has been shown and described what is at present considered the preferred embodiment of the invention, it will be obvious to those skilled in the art that various changes may be made therein without departing from the invention as defined by the appended claims.

We claim:

1. An elongated probe for measuring the depth of conductive free flowing materials in a tank comprising:
   a series of hollow contact units each having an electrode portion adapted to be contacted by conductive free flowing material in the tank, each contact unit having a lead wire attachment means disposed within the probe and electrically connected to the electrode portion;
   a series of hollow insulator units, the series of hollow contact units and hollow insulator units being arranged alternatively;
   the series of contact units and insulator units having mutual attachment means so that the probe may be assembled unit by unit as an elongated assembly;
   a base plug in one of the units which is an end of the series of contact and insulator units; and
   sealing means between the insulator units and contact units and sealing means cooperating with the base plug so as to prevent the free flowing material from reaching the interior of the probe.

2. A probe as claimed in claim 1 in which the contact unit electrode portion comprises a conductive body having a contact surface, means insulatedly supprting said body so that each conductive surface is displaced from the general surface of the probe and means connecting said contact surface to the lead wire attachment means.

3. A probe as claimed in claim 1 in which each contact unit electrode portion comprises a conductive arm insulated from contact with the conductive free flowing material, the conductive arm extending outwardly from the main axis of the elongated probe and a conductive body having contact surface, the body being attached to the arm so that substantial electrical contacts with the conductive liquid can occur only at a series of discrete and isolated areas, which lack a continuous joining surface therebetween.

4. A probe as claimed in claim 3 in which the body having a contact surface is a disc, said disc having one major surface facing away from the probe axis, the other major surface and disc periphery being insulated from contact with the conductive free flowing material.

5. A probe as claimed in claim 1 in which the contact unit comprises a pipe union type fitting of conductive material having an outer perpheral surface extending between the two adjacent insulator units.

6. A probe as claimed in claim 1 in which the base plug is formed of a conducting material and is grounded.

7. A probe as claimed in claim 1 in which the contact unit comprises a fitting of conducting material having a transverse surface within the next adjacent insulator at the distal end from the base plug, and a hole drilled and tapped in said fitting at said surface, the lead wire attachment means comprising a screw adapted to fit in said drilled and tapped hole so as to secure the wire to said surface in electrical contact therewith.

8. A probe as claimed in claim 1 in which resistor elements are accommodated within the probe and are connected between one contact unit and the next contact unit so as to reduce the number of wires in the hollow of the probe at the top end substantially below the number of contact units.

9. A probe as claimed in claim 8 in which a resistor element is connected between each contact unit and its fellow so as to reduce the number of wires in the hollow of the probe at the top to not more than two.

10. A probe as claimed in claim 1 and further comprising an indicating circuit having a supply and an indicating means and an operating circuit having a supply wherein contact units at predetermined fractions along the length of the probe are connected to the relay coils in the operating circuit, the relays being external to the probe and the relay contacts being connected in the indicating circuit and adapted to switch parallel resistors successively across the indicating circuit supply as the liquid rises so that the depth is indicated by the indicating means.

11. A probe as claimed in claim 8 and further comprising an indicating circuit having a supply and an ammeter and a relay operating circuit having a supply wherein contact units at predetermined fractions along the length of the probe are connected to relays in the operating circuit, the indicating circuit comprising a number of resistors external to the probe, said external resistors being connected to contact units adjacent those at said predetermined fractions along the length, said resistor elements accommodated within the probe and said external resistors being in series parallel arrangement with the relay contacts across the indicating circuit so that as the liquid level rises said resistor elements accommodated within said probe are successively short circuited by the liquid so that the value of current gives an approximate indication of liquid level between the predetermined fractions along the length of the probe, the relays operating so that when the liquid level rises to said predetermined fraction along the length the external resistances are successively paralleled across the indicating circuit, so that the value of current giving an accurate indication of liquid level at said predetermined fractions along said length.

12. A probe as claimed in claim 1 and further comprising:
   an indicating circuit, said indicating circuit having a supply means, indicating means and a series of switching means;
   an operating circuit having a supply means and a series of relay coils for operating said series of switching means, each relay coil being connected to a probe contact unit so as to operate said series of switching means successively as the liquid level rises;
   said indicating circuit further comprising at least one auxiliary circuit for performing an auxiliary function of alarm or an operation;
   said auxiliary circuit comprising a relay, the coil of said auxiliary circuit relay being connected in series with a further switching means which is operated by one of the relay coils of the series in the operating circuit;
   the auxiliary circuit relay coil being connected in series with a pair of its own contacts and yet another switching means operated by a corresponding relay coil so that the auxiliary circuit relay will continue to allow indication or operation after said one of said relay coils has ceased to be energized until said yet another switching means operates consequent upon a change in energization in the coil corresponding thereto in the operating circuit.

13. A probe and circuit as claimed in claim 12 in which the auxiliary circuit relay contacts operate an alarm circuit and the auxiliary circuit relay coil is operated by a switching means corresponding to a relay connected to a probe contact unit near one end of the probe and the coil corresponding to the further one of said switching means is connected to a relay adjacent to the probe contact unit near one end of the probe but closer to the centre so that the alarm signal is not affected by changes in level which are insubstantial relative to the distance between two adjacent probe contact units.

14. A probe and circuit as claimed in claim 12 in which the auxiliary circuit relay contacts operate a circuit which alters the level of the liquid and the auxiliary circuit relay coil is operated by a switching means corresponding to a relay connected to a probe contact unit near one desirable liquid level limit and the coil corresponding to the further one of said switching means connected to a probe contact unit near another desirable liquid level limit, so that when the level reaches said one probe contact unit near the one desirable liquid level the relay circuit operates to alter the liquid level so as to tend to bring it near the other desirable liquid level.

* * * * *